United States Patent [19]

Makuuchi et al.

[11]  4,332,657

[45]  Jun. 1, 1982

[54] EMULSION COMPOSITION FOR USE IN BAKING PAINT

[75] Inventors: Keizo Makuuchi, Sakai; Akio Katakai, Takasaki; Miyuki Hagiwara, Maebashi; Tsutomu Yamamoto, Kamakura; Hiroyuki Nakayama, Ninomiya; Tohru Takagi, Takasaki, all of Japan

[73] Assignees: Kansai Paint Co., Ltd., Hyogo; Japan Atomic Energy Research Institute, Tokyo, both of Japan

[21] Appl. No.: 94,882

[22] Filed: Nov. 16, 1979

[30] Foreign Application Priority Data

Dec. 1, 1978 [JP] Japan ................................. 53/148893

[51] Int. Cl.$^3$ ........................... C08F 2/46; C08F 2/54; C08L 33/08; C08L 33/10
[52] U.S. Cl. ............................... 204/159.22; 428/332; 428/463; 525/157; 526/304
[58] Field of Search ................ 526/304; 260/29.6 TA; 204/159.22

[56] References Cited

U.S. PATENT DOCUMENTS

| | | | |
|---|---|---|---|
| 3,298,978 | 1/1967 | Rutherford | 526/304 |
| 3,551,525 | 12/1970 | Wilhelm et al. | 526/304 |
| 3,798,171 | 3/1974 | Ishii et al. | 526/304 |
| 3,812,067 | 5/1974 | Katsimbas et al. | 526/304 |
| 3,845,023 | 10/1974 | Daliber | 526/304 |
| 4,105,615 | 8/1978 | Balatan | 526/304 |
| 4,107,156 | 8/1978 | Sunamori et al. | 526/304 |

*Primary Examiner*—Stanford M. Levin
*Attorney, Agent, or Firm*—Browdy and Neimark

[57] ABSTRACT

An emulsion composition for use in baking paint prepared by emulsion polymerization with ionizing radiation of a monomer mixture comprising (1) at least one acrylamide selected from the group consisting of N-methylolacrylamide and N-alkoxymethylacrylamide, (2) a radical polymerizable ethylenic unsaturated monomer having a hydroxyl group, and (3) a radical polymerizable ethylenic unsaturated monomer other than (1) and (2) above.

6 Claims, No Drawings

EMULSION COMPOSITION FOR USE IN BAKING PAINT

BACKGROUND OF THE INVENTION

1. Field of the Invention

This invention relates to an emulsion composition for use in a baking paint having high water resistance, solvent resistance, chemical resistance and weatherability and having good gloss and physical properties. More particularly, this invention relates to an emulsion composition, for use in a baking paint, which is prepared by emulsion polymerization of a monomer mixture comprising a specified acrylamide, a radical polymerizable ethylenic unsaturated monomer having a hydroxyl group, and another radical polymerizable ethylenic unsaturated monomer. The resulting emulsion can be used in a baking paint or enamel which is coated on a substrate and heated for curing.

2. Description of the Prior Art

With the current concern over air pollution and depletion of natural resources, the social demand has increased for the development of an innovative technology for making substitutes for the resin composition using an organic solvent as a medium, and one of such substrates is a polymer emulsion using water as a medium. Heretofore, various emulsions that meet specific purposes have been developed and used as paints. These emulsions are prepared by thermal emulsion polymerization that unavoidably uses a radical polymerization initiator and other water soluble compounds that will form a great amount of low-molecular hydrophilic resins. As a result, the paint film is poor in water resistance, solvent resistance, chemical resistance, gloss, weatherability and physical properties. To eliminate these disadvantages, it was previously proposed to use ionizing radiation to prepare an aqueous emulsion for use in a baking paint (see Japanese patent application Nos. 53329/77 to 53333/77). The basic concept of these processes was to prepare an emulsion having a hydroxyl group as a functional group, which was usually mixed with a melamine resin before thermal curing thereof. However, because the proposed emulsions must have miscibility with the melamine resin used as a crosslinking agent, only a few compositions could be selected for the emulsion, and in addition, a slight amount of melamine resin exuded to the surface of the film and made the film look dull.

SUMMARY OF THE INVENTION

Therefore, it has now been found that the above defects of the conventional technique could be eliminated by incorporating in the emulsion both a hydroxyl group and a methylol group or an alkoxymethyl group as a functional group reactive with the hydroxyl group.

The general purpose of this invention is to provide an emulsion composition for use in a baking paint having high water resistance, solvent resistance, chemical resistance, gloss and weatherability as well as good physical properties by means of emulsion polymerization of a monomer mixture comprising a specified acrylamide, a radical polymerizable ethylenic unsaturated monomer having a hydroxyl group, and another radical polymerizable ethylenic unsaturated monomer.

DETAILED DESCRIPTION OF THE INVENTION

The emulsion composition for use in a baking paint of this invention is prepared by dispersing a monomer mixture of the following composition in water in the presence of a surfactant and subjecting the same to emulsion polymerization under irradiation with ionizing radiation:

(a) at least one acrylamide selected from the group consisting of N-methylacrylamide and N-alkoxymethylacrylamide (hereunder sometimes referred to as "component A");

(b) a radical polymerizable ethylenic unsaturated monomer having a hydroxyl group (hereunder sometimes referred to as "component B"); and (c) a radical polymerizable ethylenic unsaturated monomer other than (a) and (b) above (hereunder sometimes referred to as "component C"). The term "acrylamide" as used in this invention also includes methacrylamide.

To prepare the emulsion composition of this invention for use in a baking paint, "component A" is used in an amount of 2 to 40% by weight based on the weight of the total monomer mixture. If less than 2 wt% of "component A" is used, the thermal crosslinking reaction is not sufficient to provide a strong film, and if more than 40 wt% of the component is used, not only is it difficult to provide a stable emulsion but also using such a great amount is simply uneconomical. "Component B" is used in an amount of 1 to 25% by weight based on the weight of the total monomer mixture. If less than 1 wt% of the component is used, the thermal crosslinking reaction is not sufficient to provide a strong film, and if more than 25 wt% of the component is used, not only is the water resistance of the film low but also using such a great amount is only uneconomical. "Component C" can be used in an amount of 35 to 97% by weight based on the weight of the total monomer mixture.

The monomer mixture of the composition defined above is dispersed in water in the presence of one or more conventional anionic, cationic or nonionic surfactants. Any one of the following methods may be followed to disperse the monomer mixture and subject the same to emulsion polymerization: (1) placing water, the monomer mixture and surfactant in a reaction vessel and stirring the reaction mixture to form an emulsion which is then irradiated with ionizing radiation to form a polymer; (2) placing water and a surfactant in a reaction vessel, stirring the charge, followed by adding the monomer mixture dropwise to the charge under irradiation with ionizing radiation to form a polymer; (3) placing water, a surfactant and part of the monomer mixture in a reaction vessel, stirring the reaction mixture to form an emulsion to which is added dropwise the remaining part of the monomer mixture (which may contain water and a surfactant) under irradiation with ionizing radiation to form a polymer; (4) placing several charges of the monomer mixture at given intervals during which each charge is polymerized with ionizing radiation for a predetermined period.

The sources of ionizing radiation to be used in this invention include electron beams, alpha rays, beta rays, gamma rays and X-rays. A suitable source, total dose of the radiation, and dose rate may be determined by the composition of the monomer mixture used, the irradiation atmosphere and temperature, the method of dispersing the monomer mixture in water, and the cost of the irradiation apparatus. In general, the total dose of the radiation may range from 0.01 Mrad to 1.0 Mrad.

Since the emulsion polymerization with ionizing radiation evolves polymerization heat, cooling water and other suitable means are preferably used to control the reaction temperature to a level between $-5°$ and $50°$ C. If the temperature exceeds $50°$ C., the crosslinking reaction due to N-methylolacrylamide or N-alkoxymethylacrylamide makes it difficult to obtain a stable emulsion in high yield.

The emulsion composition of this invention has two functional groups, i.e. a methyl group or alkoxymethyl group and a hydroxyl group; therefore, essentially, it does not require a crosslinking agent such as a melamine resin, and simply by means of heating, it is crosslinked to provide a dense film. Accordingly, the composition is free from any limitations imposed by considerations for miscibility with the melamine resin, and even if it is not highly miscible with the resin, the gloss and other properties of the film will not be reduced. The absence of the melamine resin eliminates other disadvantages often encountered in the conventional paint, i.e. difficulty in application and low storage stability.

Another advantageous feature of this invention is that a stable emulsion composition can be produced in high yield because the emulsion polymerization of radical polymerizable ethylenic monomers containing at least 20 wt% of N-methylolacrylamide or N-alkoxymethylacrylamide under irradiation with ionizing radiation is free from water soluble ionic species and proceeds at low temperature. However, if the emulsion composition of this invention is prepared by the conventional method of emulsion polymerization using a water soluble radical initiator, the reaction system contains many water soluble ionic species and the reaction proceeds at high temperature. Therefore, N-methylolacrylamide or N-alkoxymethylacrylamide causes a side reaction wherein crosslinking of polymer particles results in the formation of much agglomerate which then makes it impossible to provide a stable emulsion.

The suitable N-alkoxymethylacrylamide that can be used in this invention is one that has an alkoxymethyl group which is radical polymerizable and is reactive with a hydroxyl group. Illustrative examples of the amide include N-methoxymethylacrylamide, N-ethoxymethylacrylamide, N-propoxymethylacrylamide, N-isopropoxymethylacrylamide, N-n-butoxymethylacrylamide, N-sec-butoxymethylacrylamide, N-tert-butoxymethylacrylamide, N-isobutoxymethylacrylamide, N-n-pentoxymethylacrylamide, N-2-methylbutoxymethylacrylamide, N-2-ethylpropoxymethylacrylamide and N-2,2-dimethylpropoxymethylacrylamide.

Examples of the radical polymerizable ethylenic unsaturated monomer having a hydroxyl group and suitable for use in this invention may be represented by the following formulae:

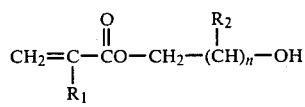

(wherein $R_1$ is H or $CH_2$, $R_2$ is H or $CH_3$, and n is from 1 to 15), and $CH_2=CH-CH_2-OH$.

Examples of the radical polymerizable ethylenic unsaturated monomer used as component C of this invention include styrene, styrene derivatives, (meth)acrylic acid, (meth)acrylates, acrylonitrile, methacrylonitrile, butadiene and vinyl esters. A suitable component C may be determined depending on the application conditions and the properties of the film required. For the purpose of crosslinking the interior of the polymer particles, 1,6-hexanediol di(meth)acrylate, divinyl benzene and other monomers having at least two radical polymerizable ethylenic unsaturated groups may be used as component C.

A film may be obtained from the emulsion composition of this invention by coating a substrate with the composition which is then heated at $110°$ to $250°$ C. for a period of 0.2 to 60 minutes. The film obtained is strong, has high water resistance and chemical resistance, and is very glossy. The composition may also be combined with a pigment, a water soluble resin or melamine resin to form a paint. It is advantageous to formulate the emulsion composition of this invention as a paint in the presence of a water soluble amino resin which reacts with polymerizable hydroxyl group in the emulsion to crosslink the same. Illustrative water soluble amino resins include di-, tri-, tetra-, penta- and hexamethylolmelamine and methyl ethers or butyl ethers thereof, a condensate of urea and formaldehyde, and a condensate of urea and melamine. These water soluble amino resins are preferably used in an amount of from 5 to 50% by weight based on the polymer content of the emulsion composition because, used in an amount within this range, the amino resins will help the emulsion composition of this invention provide a film having high water resistance, solvent resistance, chemical resistance and weatherability and good physical properties. The emulsion composition may also contain a pigment for improving the malleability and corrosion resistance of the film, and a water soluble resin, neutralizing agent and a defoaming agent, all for making the application job easy to do. There is no particular limitation on the type of these additives to be selected. It is also to be noted that the conventional method may be used to make a paint, apply it and dry the film.

In the foregoing, it has been explained that the baked enamel produced from the emulsion composition of this invention provides a film which has high water resistance, solvent resistance, chemical resistance, gloss and weatherability and good physical properties, and have also given the reasons why it is so. This invention will hereunder be described in greater detail by reference to Examples 1 to 4 which illustrate the production of the emulsion composition of this invention, and Reference Examples 1 to 4 which address the production of a baked enamel from paints containing the emulsion composition of this invention as a vehicle and 10 to 25% of butyl carbitol as medium based on the weight of the total monomer mixture. These examples and reference examples are given here for illustrative purposes only and are by no means intended to limit the scope of the invention.

EXAMPLE 1

A 3-liter 4-necked glass flask equipped with a stirring rod, a tube for introducing nitrogen gas, a tube for introducing monomers, a thermometer and a cooling tube was charged with 1050 g of deionized water and 4.5 g of sodium dodecylbenzenesulfonate. Under stirring in the atmosphere of nitrogen gas, a monomer mixture comprising 400 g of n-butyl methacrylate, 25 g of N-n-butoxymethylacrylamide, 20 g of 2-hydroxyethyl methacrylate and 5 g of acrylic acid was added dropwise to the charge over a period of 2 hours while it was irradiated with gamma rays from Co-60 at 30° C. at a dose rate of 0.02 Mrad/hr. After the dropwise addition, the monomer mixture was irradiated with gamma rays for 2 more hours under the same conditions. The resulting emulsion was designated emulsion A.

EXAMPLE 2

The procedure of Example 1 was repeated except that the monomer mixture comprised 270 g of n-butyl methacrylate, 90 g of N-n-butoxymethylacrylamide, 83 g of 2-hydroxyethyl methacrylate and 7 g of acrylic acid. The resulting emulsion was designated emulsion B.

EXAMPLE 3

The procedure of Example 1 was repeated except that the monomer mixture comprised 20 g of styrene, 20 g of n-butyl acrylate, 318 g of n-butyl methacrylate, 45 g of N-isobutoxymethylacrylamide, 45 g of triethylene glycol monoacrylate and 2 g of 1,6-hexanediol diacrylate. The resulting emulsion was designated emulsion C.

EXAMPLE 4

A monomer mixture comprising 340 g of n-butyl methacrylate, 54 g of N-isobutoxymethylacrylamide, 54 g of 2-hydroxyethyl acrylate and 2 g of acrylic acid was prepared and divided into 3 equal portions. A flask of the same type as used in Example 1 was charged with 1050 g of deionized water, 9 g of sodium laurylbenzenesulfonate and one-third of the monomer mixture, and the reaction mixture was polymerized for one hour under the same conditions as in Example 1. Another one-third of the monomer mixture was poured into the flask and polymerized for another one hour. The last one-third of the monomer mixture was then charged and polymerized for a period of 3 more hours. The resulting emulsion was designated emulsion D.

REFERENCE EXAMPLES 1 TO 4

Bonderized steel sheets were sprayed with emulsions A to D which were dried with heat at 160° C. for 30 minutes to provide films each 30μ thick. The results of performance tests with these films are shown in Table 2 below from which it is clear that the films obtained from the emulsion of this invention have good properties.

TABLE 1

| Specimen Test item Emulsion No. | Agglomerate | Nonvolatile content (%) | Viscosity (CP) | pH | Particle size (μ) | Residual monomer (%) | Freeze resistance | Heat stability |
|---|---|---|---|---|---|---|---|---|
| A | no | 30.1 | 187 | 5.2 | 0.1> | 0.1 | 1.0 | 1.1 |
| B | no | 30.4 | 240 | 3.8 | 0.1> | 0.2 | 1.0 | 1.0 |
| C | no | 29.8 | 375 | 6.7 | 0.1> | 0.3 | 1.0 | 1.1 |
| D | no | 30.5 | 125 | 6.0 | 0.1> | 0.1 | 1.0 | 1.0 |

TABLE 2

| Specimen Test item Emulsion No. | Gloss | Hardness | Water resistance | Alkali resistance | Acid resistance | Anti-xylol resistance (times) | Erichsen test | Impact resistance | Weatherability | Rinsing resistance (times) |
|---|---|---|---|---|---|---|---|---|---|---|
| A | 98 | F | no blister | O | O | 30 OK | 10< | 50< | 92 | 5000< |
| B | 96 | H | no blister | O | O | 30 OK | 10< | 50< | 90 | 5000< |
| C | 95 | 2H | no blister | O | O | 30 OK | 10< | 50< | 89 | 5000< |
| D | 95 | H | no blister | O | O | 30 OK | 10< | 50< | 90 | 5000< |

O: good and no change resulted

PERFORMANCE TESTS

The performance tests were conducted with the emulsions A to D prepared in Examples 1 to 4 as well as with the films obtained from the paints incorporating those emulsions. The results are shown in Tables 1 and 2.

TESTING METHODS EMPLOYED (a) Agglomerate: observed with the naked eye
(b) Nonvolatile content: ASTM D2832-69
(c) Viscosity: ASTM D2196-68, 30 rpm
(d) pH: ASTM E70-68
(e) Particle size; observed with an electron microscope
(f) Residual monomer: the percentage for the monomer mixture charged by gas chromatography
(g) Freeze resistance: ASTM D2243-68, the viscosity after 5 freeze/thaw cycles (1 cycle consisted of 8-hr freezing at −20° C. and 16-hr standing at 25° C.) was measured against the initial viscosity.
(h) Heat stability: ASTM D562-55, the viscosity after 7-day heating at 50° C. was measured against the initial viscosity.
(i) Gloss: Surface reflectivity at 60°
(j) Hardness: pencil hardness
(k) Water resistance: ASTM D714-56, the film was immersed in tap water at 40° C. for 20 days and any blistering was checked.
(l) Alkali resistance: 0.2 cc of 0.1 N NaOH was placed on the film, rinsed 24 hours later, and any resulting change was checked.
(m) Acid resistance: 0.2 cc of 0.1 N $H_2SO_4$ was placed on the film, rinsed 24 hours later, and any resulting change was checked.
(n) Anti-xylol resistance: The film of the surface was rubbed with xylene-containing gauze 30 times, and any resulting change was checked.
(o) Erichsen test: Erichsen tester (20φ ball) was used.
(p) Impact resistance: Du Pont impact tester was used. The height at which the film broke with a 500 g, ½ in. falling ball was measured.
(q) Weatherability: The gloss after 400-hr exposure to sunshine weatherometer was evaluated.

(r) Rinse resistance: ASTM D2486-69T, the number of rinsings that caused the film to break were counted.

It is obvious from Tables 1 and 2 that the emulsion composition of this invention and the film obtained from a paint using the composition as a vehicle had high water resistance, solvent resistance, chemical resistance, gloss and weatherability and good physical properties.

What is claimed is:

1. An aqueous polymer emulsion for use in a baking paint prepared by a process consisting essentially of dispersing a monomer mixture of (A) 2 to 40% by weight of at least one acrylamide selected from the group consisting of N-methylolacrylamide and N-alkoxymethylacrylamide; (B) 1 to 25% by weight of one or more radical polymerizable ethylenic unsaturated monomers having a hydroxyl group having the formula

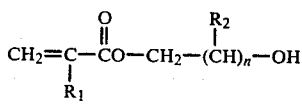

wherein $R_1$ is H or $CH_3$, $R_2$ is H or $CH_3$, and n is from 1 to 15; or $CH_2=CH-CH_2-OH$; and (C) 35 to 97% by weight of one or more radical polymerizable ethylenic unsaturated monomers selected from the group consisting of styrene, styrene derivatives, (meth)acrylic acid, (meth)acrylates, acrylonitrile, methacrylonitrile, butadiene, vinyl esters, 1,6-hexanediol di(meth)acrylate and divinyl benzene, the percentages of (A)+(B)+(C) being 100, in water in the presence of surfactant to form an emulsion and irradiating the emulsion with ionizing radiation.

2. The aqueous polymer emulsion as defined in claim 1, wherein the emulsion polymerization is carried out at a temperature from $-5°$ to $50°$ C.

3. The aqueous polymer emulsion of claim 1 wherein the total dose of radiation is 0.01 Mrad to 1.0 Mrad.

4. The aqueous polymer emulsion of claim 1 wherein monomer (A) is present in an amount of at least 20 wt/%.

5. The aqueous polymer emulsion of claim 1 wherein monomer (A) is selected from the group consisting of N-methoxymethylacrylamide, N-ethoxymethylacrylamide, N-propoxy-methylacrylamide, N-isopropoxymethylacrylamide, N-n-butoxymethylacrylamide, N-sec-butoxymethylacrylamide, N-tert-butoxymethylacrylamide, N-isobutoxymethylacrylamide, N-n-pentoxymethylacrylamide, N-2-methylbutoxymethylacrylamide, N-2-ethylpropoxymethylacrylamide and N-2,2-dimethylpropoxymethylacrylamide.

6. The aqueous polymer emulsion of claim 1 wherein monomer (C) has at least two radical polymerizable ethylenic unsaturated groups.

* * * * *